G. V. BRECHT.
Meat Cutter.
No. 14,901.
Patented May 20, 1856.
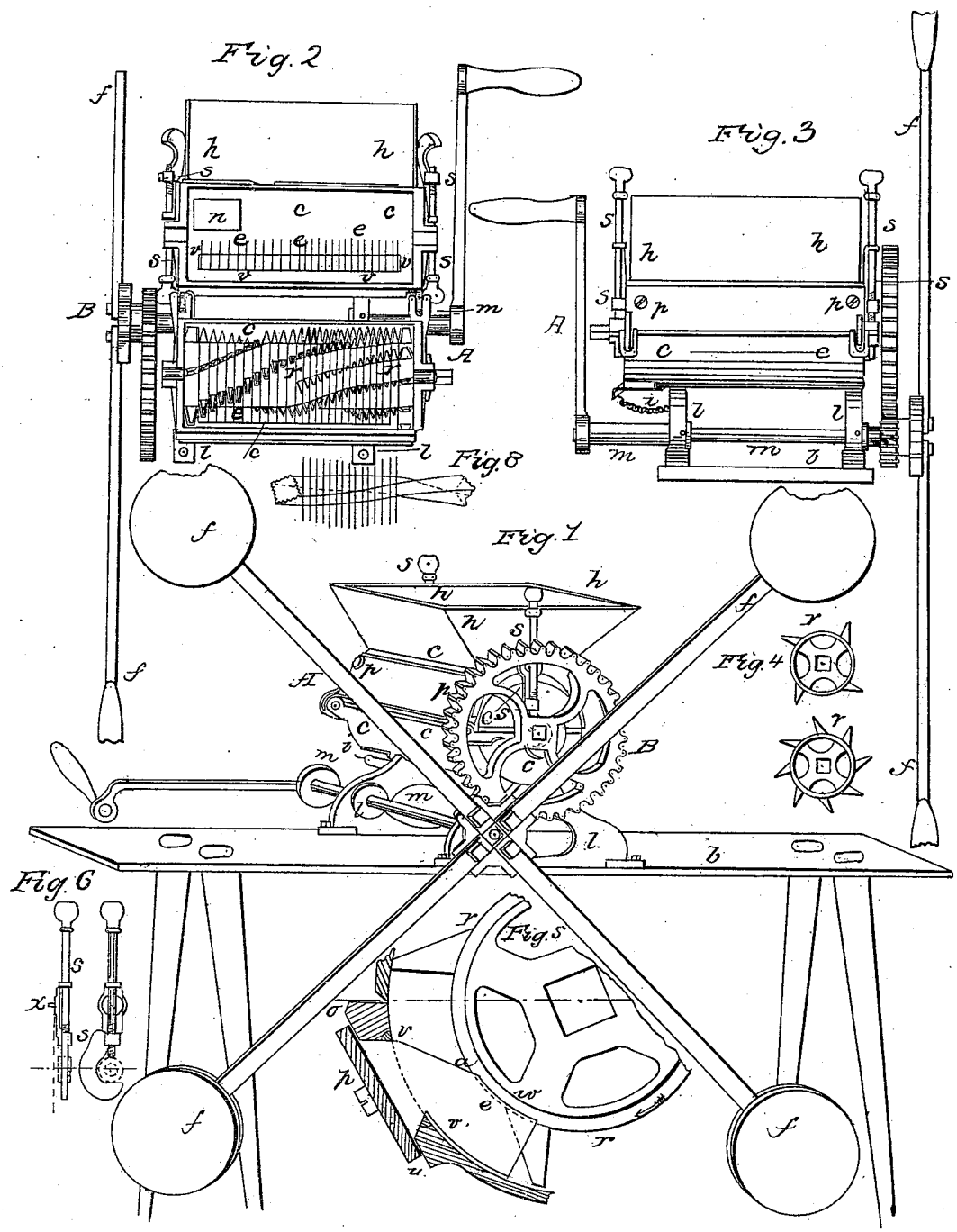

UNITED STATES PATENT OFFICE.

GUSTAVUS V. BRECHT, OF ST. LOUIS, MISSOURI.

IMPROVEMENT IN MACHINES FOR CUTTING MEAT.

Specification forming part of Letters Patent No. 14,901, dated May 20, 1856.

*To all whom it may concern:*

Be it known that I, GUSTAVUS V. BRECHT, of the city and county of St. Louis, and State of Missouri, have invented new and useful Improvements in Meat-Cutting Machines or Meat-Cutters; and I do hereby declare that the following is a full, clear, and exact description of the construction and operation of the same, reference being had to the accompanying drawings.

Figure I is a perspective view; Fig. II, a ground plan; Fig. III, a side elevation; Fig. IV, parts of the roller; Fig. V, a knife with parts of the roller and cylinder; Fig. VI, a clasp-screw to be placed one at either end of the cylinder.

The perspective view, Fig. I, is taken from the hind part of the machine in order to let the whole mechanism be more clearly seen and appear.

A is the front end of the machine, and B the hind one.

$b$, Fig. I, is a bench on which the whole machine is fastened.

$c$ is the hollow cylinder, consisting of two halves.

$r$, Fig. II, is the roller with tooth rows.

$h$ is the hopper into which the meat is deposited.

$ffff$ represent the four swinging or flying arms of a part of the machine supplying the part of a swinging or fly wheel.

$s\ s$ represent two clasp-screws, which keep together the two halves of the cylinder, or which confine the upper part of the cylinder to the lower.

In using the said machine the handle or crank is turned around with the right hand, and with the left hand at the same time the meat which is deposited in the hopper is pushed in the opening at $n$, Fig. II. The roller $r$ is set in motion by the pinion-work, takes the meat in through the opening $n$, drags it over the knives, and pushes it forward to the outlet-opening, (marked $i$.) From that point or outlet the minced meat falls in a vessel to be placed under it. On the said outlet-opening there is provided and placed a sliding shutter or bar, which may be opened or shut to suit the working of the machine.

In constructing the machine the following instructions are given:

First. Multiply rows of teeth toward the end of the roller $r$, Fig. II, for reducing the minced meat to the required fineness after it has arrived at the said rows of teeth and before it leaves the outlet $i$.

Second. Give a concave shape to the knives at their edges where they meet the roller $r$, Fig. V, so as to give them a longer edge, (marked $a$,) whereby one will be enabled to grind the knives less and keep them for a long time near the roller. Thereby will also be caused and secured a thorough and complete cutting and mincing of the meat.

Third. Construct the roller, which consists of a series of circular tooth-plates, as may be seen from Fig. IV. The said plates are to be put upon a twisted square shaft. (See Fig. 8 of drawings.) The twisting of the shaft gives a corresponding curve line to the teeth-rows of the roller. The space between the plates of the roller is to be filled with cement and the two solid plates at the ends of the roller to be securely fastened to the shaft.

Fourth. Secure the knives inside of the cylinder on either half of it all along its whole length by a fusible metal, Figs. II and V, so that they can be removed separately without removing the fusible metal. A back plate to secure the knives in their places is fastened outside and upon the whole length of the corresponding part of the cylinder $p$, Figs. I, III, and V. To withdraw the knives, remove the back plate $p$ and introduce a small pry between the back of the blade $e$ and the face of the cylinder or concave, and thus the knife will be raised from its socket in the fusible metal and can be withdrawn at the rear of the machine.

Fifth. Arrange the outlet (marked $i$) next to the front, near the crank, so that the minced meat can freely pass in the front of the table or bench and always remains under the inspection of the operator, by means of which the said machine may be used without fly-wheels and pinion-work for domestic purposes or family use.

Sixth. Place screw-clasps (marked $s$) on either end of the cylinder for the purpose as well of keeping closely together both halves of the cylinder at their boxes as to open it easily. When the screws are unscrewed sufficiently so as to remove the clasps, the top half of the cylinder can be opened. Fig. VI shows one of these screw-clasps in two views. The pivot $x$, on which the clasp moves, is behind the set-screw, and is attached to the clasp and to the upper part of the machine.

Having thus fully described my invention, I state that I do not claim to be the original inventor of a meat-cutter or a machine for cutting meat; but

What I do claim therein as new in connection with such a machine, and desire to secure by Letters Patent, is—

The roller as constructed of a series of circular plates having teeth or hooks on their peripheries when said plates are put on a twisted square shaft, thus making rows of teeth of the edges of the several plates and by the twist of the shaft giving them a spiral form.

GUSTAVUS V. BRECHT.

Witnesses:
TH. UHLMANN,
ROBERT HENNIG.